US012020554B1

(12) United States Patent
Oostergo et al.

(10) Patent No.: US 12,020,554 B1
(45) Date of Patent: Jun. 25, 2024

(54) DETECTION AND ALERTING BASED ON ROOM OCCUPANCY

(71) Applicant: Amazon Technologies, Inc., Seattle, WA (US)

(72) Inventors: Milo Oostergo, Eemnes (NL); Sadie Mackay, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/059,132

(22) Filed: Nov. 28, 2022

Related U.S. Application Data

(63) Continuation of application No. 17/031,497, filed on Sep. 24, 2020, now Pat. No. 11,545,024.

(51) Int. Cl.
| | | |
|---|---|---|
| *G08B 21/22* | (2006.01) | |
| *G06Q 10/0631* | (2023.01) | |
| *G08B 21/18* | (2006.01) | |
| *G10L 25/57* | (2013.01) | |
| *G10L 25/60* | (2013.01) | |
| *G10L 25/78* | (2013.01) | |

(52) U.S. Cl.
CPC ....... *G08B 21/22* (2013.01); *G06Q 10/06314* (2013.01); *G08B 21/182* (2013.01); *G10L 25/57* (2013.01); *G10L 25/60* (2013.01); *G10L 25/78* (2013.01)

(58) Field of Classification Search
CPC .................. G08B 21/22; G08B 21/182; G06Q 10/06314; G10L 25/57; G10L 25/60; G10L 25/78
USPC ...................................... 340/573.1
See application file for complete search history.

(56) References Cited

U.S. PATENT DOCUMENTS

| | | | | |
|---|---|---|---|---|
| 4,965,753 A | * | 10/1990 | Kraemer | ............... G06T 15/205 |
| | | | | 345/953 |
| 7,330,110 B1 | * | 2/2008 | Heintzman | ............. G06F 9/542 |
| | | | | 340/4.62 |
| 8,995,635 B1 | | 3/2015 | Satyanarayanan et al. | |
| 9,297,882 B1 | | 3/2016 | Bhatia | |
| 9,554,091 B1 | | 1/2017 | Malegaonkar et al. | |
| 9,791,910 B1 | | 10/2017 | Brown et al. | |
| 9,877,266 B1 | * | 1/2018 | Knas | ....................... H04W 4/04 |
| 10,043,360 B1 | | 8/2018 | Mullins | |
| 10,674,307 B1 | * | 6/2020 | Robinson | ................ H04S 7/304 |

(Continued)

FOREIGN PATENT DOCUMENTS

JP  2020181471  * 11/2020

OTHER PUBLICATIONS

U.S. Appl. No. 17/031,219, filed Sep. 24, 2020, Oostergo et al.

*Primary Examiner* — Kerri L McNally
*Assistant Examiner* — Thang D Tran
(74) *Attorney, Agent, or Firm* — BakerHostetler

(57) ABSTRACT

Input data, such as audio and/or video data, may be captured from a first room, for example via microphones and/or cameras within the first room. A first quantity of people within the first room may be determined based at least in part on the input data. An alert may be provided when the first quantity of people exceeds a threshold quantity of people. Additionally, locations of people within the room may also be detected based at least in part on the input data. A first proximity of a first person in the room to a second person in the room may be determined. An alert may also be provided when the first proximity is less than a threshold proximity.

14 Claims, 12 Drawing Sheets

(56) References Cited

U.S. PATENT DOCUMENTS

| | | | |
|---|---|---|---|
| 10,860,954 B1* | 12/2020 | Yeluguri | G06F 3/0482 |
| 11,159,768 B1 | 10/2021 | Liu et al. | |
| 11,184,739 B1* | 11/2021 | Wellig | G16H 50/70 |
| 2003/0097283 A1* | 5/2003 | Kimura | G06Q 20/10 |
| | | | 705/5 |
| 2004/0002930 A1 | 1/2004 | Oliver et al. | |
| 2006/0132304 A1 | 6/2006 | Cabell | |
| 2008/0002789 A1 | 1/2008 | Jao et al. | |
| 2009/0009587 A1* | 1/2009 | Lindbergh | H04N 7/152 |
| | | | 348/E7.083 |
| 2009/0024439 A1* | 1/2009 | Ryan | G06Q 10/06314 |
| | | | 705/7.22 |
| 2009/0030967 A1 | 1/2009 | Loda | |
| 2010/0164713 A1* | 7/2010 | Wedig | G08B 7/066 |
| | | | 340/539.13 |
| 2010/0217669 A1* | 8/2010 | Gazdzinski | G06F 3/044 |
| | | | 345/173 |
| 2011/0241877 A1* | 10/2011 | Wedig | G08B 17/00 |
| | | | 340/540 |
| 2012/0066275 A1* | 3/2012 | Gerstner | G06F 16/29 |
| | | | 707/825 |
| 2013/0006630 A1 | 1/2013 | Hayakawa et al. | |
| 2013/0179214 A1* | 7/2013 | Ainsworth | G06Q 10/06315 |
| | | | 705/7.25 |
| 2013/0246108 A1 | 9/2013 | Nagy et al. | |
| 2014/0099921 A1 | 4/2014 | Weiss | |
| 2014/0108065 A1* | 4/2014 | Wootliff | G06Q 30/0207 |
| | | | 705/5 |
| 2014/0147824 A1* | 5/2014 | Kumar T | G09B 5/00 |
| | | | 434/350 |
| 2015/0009332 A1* | 1/2015 | Fuhrmann | G07C 9/00 |
| | | | 348/155 |
| 2015/0134418 A1* | 5/2015 | Leow | G06F 16/29 |
| | | | 705/7.34 |
| 2015/0340048 A1 | 11/2015 | Shioda et al. | |
| 2015/0362909 A1* | 12/2015 | McReynolds | G06Q 10/04 |
| | | | 700/275 |
| 2015/0382124 A1 | 12/2015 | Hall et al. | |
| 2016/0035213 A1 | 2/2016 | Choi | |
| 2016/0180259 A1* | 6/2016 | Marianko | H04L 65/1069 |
| | | | 705/5 |
| 2016/0203699 A1* | 7/2016 | Mulhern | G06V 20/52 |
| | | | 340/573.1 |
| 2016/0247364 A1* | 8/2016 | Herman | G08B 19/005 |
| 2016/0261984 A1 | 9/2016 | Shrinath | |
| 2016/0301373 A1 | 10/2016 | Herman et al. | |
| 2016/0358443 A1 | 12/2016 | True | |
| 2016/0371967 A1 | 12/2016 | Narang et al. | |
| 2017/0017214 A1* | 1/2017 | O'Keeffe | G05B 15/02 |
| 2017/0025124 A1 | 1/2017 | Mixter et al. | |
| 2017/0311092 A1 | 10/2017 | Secall et al. | |
| 2017/0357948 A1* | 12/2017 | Archer | H04W 4/021 |
| 2018/0007210 A1 | 1/2018 | Todasco | |
| 2018/0047394 A1 | 2/2018 | Tian et al. | |
| 2018/0053394 A1 | 2/2018 | Gersten | |
| 2018/0196266 A1 | 7/2018 | Jin | |
| 2019/0057464 A1* | 2/2019 | Chapoutot | G06Q 30/0223 |
| 2019/0096220 A1* | 3/2019 | Anderholm | G08B 21/0476 |
| 2019/0123591 A1 | 4/2019 | Azam et al. | |
| 2019/0124471 A1 | 4/2019 | Chelnik | |
| 2019/0130367 A1 | 5/2019 | Pell et al. | |
| 2019/0174241 A1 | 6/2019 | Janssen | |
| 2019/0279506 A1 | 9/2019 | Kelgernon | |
| 2019/0282892 A1 | 9/2019 | Miyaki | |
| 2019/0303685 A1* | 10/2019 | Nagao | G08B 21/182 |
| 2019/0341053 A1 | 11/2019 | Zhang et al. | |
| 2019/0341057 A1 | 11/2019 | Zhang et al. | |
| 2020/0066294 A1 | 2/2020 | Zass | |
| 2020/0118045 A1* | 4/2020 | Chung | G06Q 10/06314 |
| 2020/0134243 A1* | 4/2020 | Vardi | G06F 30/27 |
| 2020/0175965 A1 | 6/2020 | Subramanian et al. | |
| 2020/0186743 A1* | 6/2020 | Lee | G08B 21/22 |
| 2020/0294382 A1* | 9/2020 | Pradhan | G08B 13/19 |
| 2020/0311635 A1* | 10/2020 | Emig | G06Q 10/1095 |
| 2020/0364026 A1 | 11/2020 | Lee et al. | |
| 2020/0365168 A1 | 11/2020 | Cho et al. | |
| 2020/0379730 A1* | 12/2020 | Graham | G06F 3/167 |
| 2020/0387719 A1* | 12/2020 | Jung | G06F 18/22 |
| 2020/0410250 A1* | 12/2020 | Miller | G06V 20/20 |
| 2021/0046650 A1* | 2/2021 | Deyle | G06Q 10/087 |
| 2021/0056513 A1* | 2/2021 | Lee | G06N 5/04 |
| 2021/0103044 A1* | 4/2021 | Droitcour | G01S 13/56 |
| 2021/0327449 A1 | 10/2021 | Shin et al. | |
| 2021/0366277 A1 | 11/2021 | Abedi et al. | |
| 2021/0409972 A1* | 12/2021 | Byrne | H04W 36/04 |
| 2022/0012504 A1 | 1/2022 | Liu et al. | |
| 2022/0042694 A1* | 2/2022 | He | F24F 11/88 |
| 2022/0043869 A1 | 2/2022 | Aher et al. | |

* cited by examiner

| Alert 193 |
|---|
| The detected quantity of people in the current room has exceeded an acceptable threshold quantity |
| Notification 301 |
| Please move this meeting to Room A, which is currently available and is large enough to acceptably fit all people from the current room |

| Alert 193 |
|---|
| The detected quantity of people in the current room has exceeded an acceptable threshold quantity |
| Notification 302 |
| There is no other currently available room that is large enough to acceptably fit all people from the current room. Please have four people from the current room move to Room B, which is currently available. |

| Alert 193 |
|---|
| The detected quantity of people in the current room has exceeded an acceptable threshold quantity |
| Notification 303 |
| There is no other currently available room that is large enough to acceptably fit all people from the current room. However, Room C, which is large enough to fit all people from the current room, will become available at 3:00. Please resume this meeting at 3:00 in Room C. |

FIG. 3

| Report 501 – (Room X; Threshold = Ten) | | | | |
|---|---|---|---|---|
| Meeting ID 511 | Meeting Time 512 | Max Detected People 513 | Requests 514 | Compliance 515 |
| Meeting A | May 8, 1:00-3:00 | Fourteen | Move all people to larger room | Yes |
| Meeting B | May 9, 9:00-10:00 | Fifteen | Split people between rooms | Yes |
| Meeting C | May 10, 2:00-4:00 | Thirteen | Delay meeting until larger room becomes available | No |

| Recommendations 502 |
|---|
| Encourage Meeting Participants to Use Larger Rooms when Appropriate<br>Combine Room X with Adjacent Room (If Available)<br>Provide additional training to observe room capacities, alerts and instructions |

| Report 503 – (Room Z; Threshold = Fifty) | | |
|---|---|---|
| Meeting ID 511 | Meeting Time 512 | Max Detected People 513 |
| Meeting D | June 8, 1:00-3:00 | Four |
| Meeting E | June 9, 9:00-10:00 | Four |
| Meeting F | June 10, 2:00-4:00 | Three |

| Recommendations 504 |
|---|
| Encourage Meeting Participants to Use Smaller Rooms when Appropriate<br>Divide Room Z into Multiple Smaller Rooms |

FIG. 5

DETECTION AND ALERTING BASED ON ROOM OCCUPANCY

CROSS-REFERENCE TO RELATED APPLICATIONS

This application is a continuation of U.S. patent application Ser. No. 17/031,497, filed on Sep. 24, 2020, entitled "DETECTION AND ALERTING BASED ON ROOM OCCUPANCY", which is hereby incorporated by reference in its entirety. This application is related to the following application, which is hereby incorporated by reference in its entirety: U.S. patent application Ser. No. 17/031,219 filed Sep. 24, 2020, entitled "DETECTION AND ALERTING BASED ON ROOM OCCUPANCY".

BACKGROUND

Businesses and other organizations may provide physical spaces, such as meeting rooms, for employees and other individuals to participate in meetings. In some examples, these organizations may offer a variety of rooms of different sizes, such as to accommodate meetings having different quantities of participants. In some cases, scheduling software may allow rooms to be reserved for various time slots, such as to avoid conflicts in which different groups of participants are attempting to occupy the same room at the same time. This may assist in allowing users to know, prior to a meeting, which rooms are available for hosting of the meeting. In some examples, a meeting room may include a computing system with audio, video and/or other conferencing components, which may allow people in a room to hold a meeting, or otherwise communicate, with other people external to the room, for example over one or more computing networks. These conferencing components may include a video camera, a microphone, a display, speakers, and other components. In some cases, one or more microphones may be integrated with a voice-activated computing system that is capable of recognizing speech, for example including recognizing and responding to verbal commands.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 is a diagram illustrating example notifications that may be used in accordance with the present disclosure.

FIG. 5 is a diagram illustrating example room usage reports that may be used in accordance with the present disclosure.

DETAILED DESCRIPTION

Figure 1:
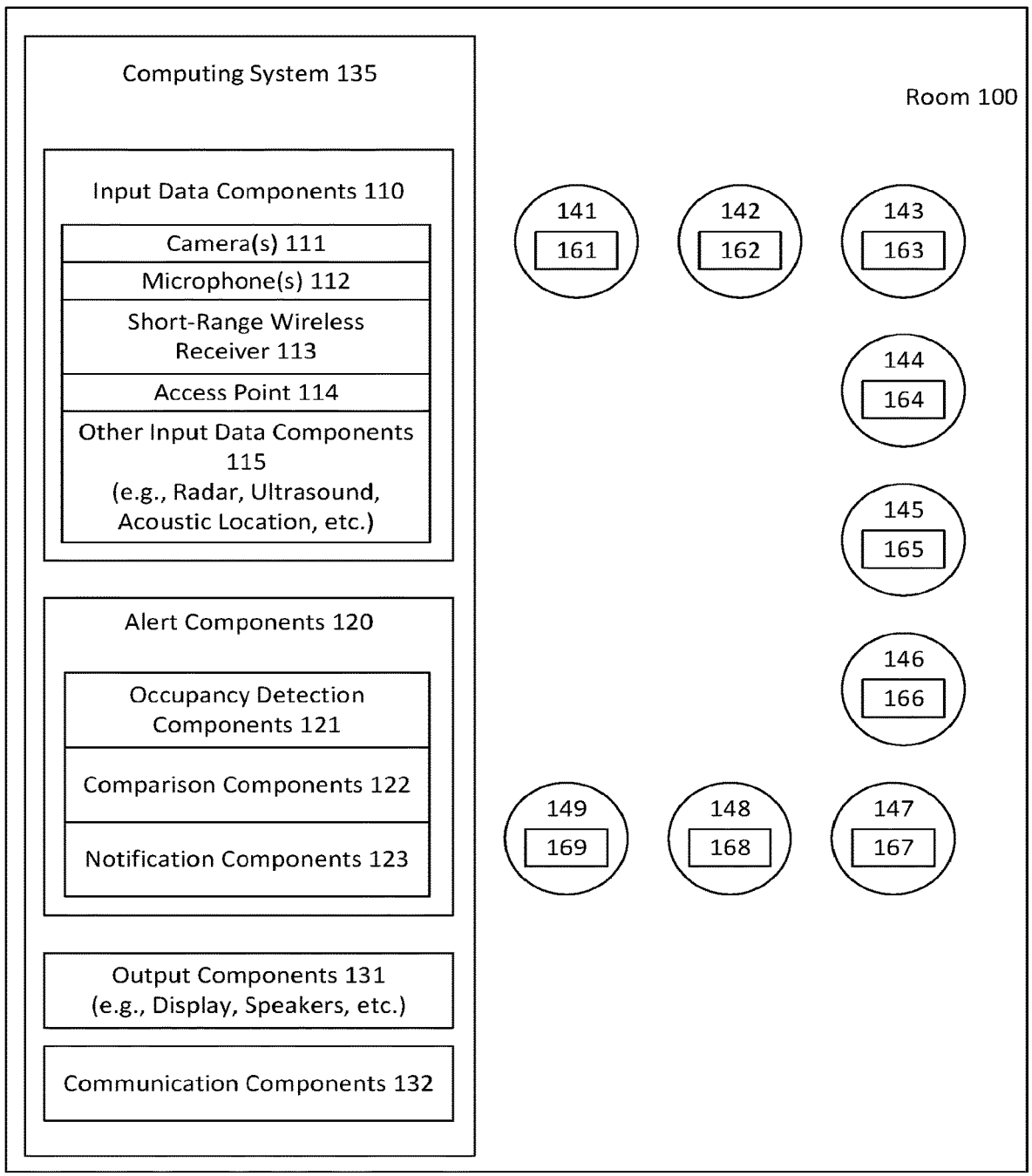
FIG. 1 is a diagram illustrating an example altering system that may be used in accordance with the present disclosure.

Techniques for detection and alerting of room occupancy are described herein. A room, such as a meeting room or conference room, may be occupied by a group of people. The room may include a computing system, such as an audio and/or video conferencing system that allows the people in the room to communicate with other people external to the room. The computing system may include input data components that capture input data from within the room, such as one or more cameras, one or more microphones, and other input data components. For example, cameras may be employed to capture video of meeting participants, while microphones may be employed to capture audio of meeting participants. In some cases, a plurality of microphones may be included in the room at different locations, such as within a plurality of different devices and/or within a microphone array of a single device. In one specific example, a microphone array may be included in a voice-activated computing device that is capable of recognizing speech, for example including recognizing and responding to verbal commands.

In some examples, the captured input data may be provided to occupancy detection components, which may analyze the input data to detect and determine a quantity of people in the room, for example via one or more recognition techniques. For example, when the input data includes video data, the video data may be analyzed via object recognition techniques to detect and count people within the room. As another example, when the input data includes audio data, the audio data may be analyzed via audio recognition techniques to detect distinct voices within the room (each corresponding to a distinct person) and count people within the room. As another example, at least part of the input data may be received from a short-range wireless (e.g., BLUETOOTH®) receiver and/or other wireless protocol (e.g., WI-FI®) access point, and this data may be used to count a quantity of computing devices (e.g., smartphones, tablets, etc.) that connect to the receiver and/or access point, or transmit a beacon, and which, therefore, may be presumed to be in the room. The quantity of people in the room may then be determined based additionally, or alternatively, on the quantity of connected computing devices within the room. As yet another example, other technologies, such as radar, ultrasonic, acoustic location, and the like, may be employed to detect and count the quantity of people in the room.

Upon determining a detected quantity of people in the room, the detected quantity may be compared to a threshold quantity. In some examples, if the detected quantity of people exceeds the threshold quantity of people, then the room may be determined to be over-occupied. In some cases, the threshold quantity of people may be determined by the computing system, such as based on a size of the room and a selected threshold person density for the room. In some examples, the size of the room may be determined by the computing system, for example based on radar, ultrasonic, acoustic location, and the like. In some examples, the threshold person density may be a static amount or may vary based on factors such as date, time, month, season, and/or other factors.

When the detected quantity of people violates the threshold quantity of people, the computing system may generate one or more alerts indicating that the room is under/over-occupied. In some examples, the alert may include an indication that one or more people in the room should exit the room and/or move to another location, such as another available room. For example, the notification may instruct all people in the room to move to another larger/smaller room with a larger/smaller person capacity. As another example, the notification may instruct some (but not all) of the people in the room to move to another room, such as another room with conferencing capabilities that may allow inter-room communication. As yet another example, the notification may include a request to delay a current meeting until a later time when another larger room becomes available and to restart the meeting at the later time. In some examples, in order to generate notifications such as those described above, the computing system may have access to room re-assignment information, such as room location information, room availability information, and room capacity information. This information may be used to determine other rooms that are in proximity of the current room, as well as the availability and capacity of those rooms.

In some examples, data regarding the detected quantity of people within a room may be collected over time and used to understand how to utilize the room and other organizational spaces more efficiently. For example, in some cases, a report may be generated that indicates usage characteristics of the room during a selected time period. The report may include indications of occurrences when an alert was generated due to an under/over-occupancy of the room. The report may also include indications of corresponding requests (e.g., move to larger/smaller available room, split meeting between multiple rooms, delay meeting, etc.) as well as indications of an extent to which people complied with the requests (e.g., requests followed, partially followed, not followed, etc.). The report may also include various recommendations. For example, if a room is consistently under/over-occupied, then recommendations may be made to schedule meetings in a larger room, to combine a room with one or more adjacent rooms, or to train or encourage employees to be more observant of room capacities and corresponding alerts and requests. As yet another example, if observed room capacities are consistently below the threshold capacity, then recommendations may be made to schedule meetings in a smaller room or to potentially split the existing room into two or more smaller rooms.

A computing system may also use the input data to determine locations of people in the room and determine a proximity of people in the room to one another. In some cases, locations of people in the room may be determined based on audio data received from a plurality of microphones at a plurality of locations within the room (e.g., a microphone array, etc.). For example, a computing system may perform an audio recognition analysis to determine a first portion of captured audio data that includes one or more words spoken by a first person in the room. The computing system may then determine characteristics (e.g., receipt time, amplitude etc.) of the first portion of the audio data received by the plurality of microphones and compare the received characteristics to determine the first person's location within the room (e.g., via triangulation, etc.). For example, if words spoken by the first person are received by a microphone in the front of the room at an earlier time and/or with a louder/higher amplitude then those words are received by a microphone in the back of the room, then this may indicate that the first person is located closer to the front of the room than to the back of the room. The computing system may also perform this process for words spoken by a second person in the room in order to determine a location of the second person in the room. The computing system may then determine a calculated proximity of a first location of the first person to a second location of the second person. This calculated proximity may be compared to a threshold proximity. If the calculated proximity is less than the threshold proximity, then an alert may be generated. The alert may include a notification that instructs the first person and the second person to move further apart from one another. In some cases, a sub-room area may be determined based on the location of the first person. For example, the sub-room area may be an area within a circle (or portion thereof) that surrounds the first person at a distance of the threshold proximity from the first person. In some examples, if the second person is located within the sub-room area, then the alert may be generated. In some examples, the threshold proximity may be a static amount or may vary based on factors such as date, time, month, season, and/or other factors.

In some cases, the computing system may use the above described location-based techniques to determine an average proximity of people in the room to one another, such as an average proximity of each person in the room to each other person in the room or an average proximity of each person in the room to a closest other person in the room. This average proximity may then be compared to the threshold proximity, and an alert may be generated if the average proximity is less than threshold proximity. Alternatively, an alert may be generated if a threshold amount of people in the room (e.g., fifty percent, two-thirds, etc.) have a proximity to one another (or to another closest person) than is less than the threshold proximity.

In some examples, in addition or as an alternative to audio data, other forms of input data (e.g., video data, etc.) may be analyzed to determine locations of people in the room. For example, in some cases, audio data may be analyzed locally (i.e., by a computing system within or in close proximity to the room) to determine audio-based locations of people in the room, while video data may be analyzed by one or more remotely (e.g., via cloud-based computing systems) to determine video-based locations of people in the room. The analysis may be performed in this manner because analysis of the video data may sometimes require additional computing resources that may not be as readily available locally. Also, in some examples, the audio-based locations may be estimated locations that are less precise/accurate than the video-based locations. Thus, in some examples, after being calculated remotely, the video-based locations may be sent back to the local computing systems to confirm or adjust the estimated audio-based locations. Moreover, in some examples, both the audio-based locations and the respective video-based locations may be used as training inputs that may be provided to one or more machine learning algorithms that may use the inputs in order to improve and enhance techniques for location estimations.

FIG. 1 is a diagram illustrating an example altering system that may be used in accordance with the present disclosure. As shown in FIG. 1, a room 100, such as a meeting room or conference room, is occupied by people 141-149. The room 100 includes a computing system 135. In one specific example, the computing system 135 may be an audio and/or video conferencing system that allows the people 141-149 to communicate with other people external to the room. The computing system may include input data components 110 that capture input data from within the room. In the example of FIG. 1, the input data components 110 include camera(s) 111, microphone(s) 112, short-range wireless (e.g., BLUETOOTH®) receiver 113, wireless (e.g., WI-FI®) access point 114, and other input data components 115 (e.g., radar, ultrasonic, acoustic location, etc.) For example, camera(s) 111 may be employed to capture video of people 141-149, while microphone(s) 112 may be employed to capture audio of people 141-149. In some cases, microphone(s) 112 may include a plurality of microphones at different locations, such as within a plurality of different devices and/or within a microphone array of a single device. In one specific example, a microphone array may be included in a voice-activated computing device that is capable of recognizing speech, for example including recognizing and responding to verbal commands.

The input data captured by input data components 110 may be provided to occupancy detection components 121, which may analyze the input data to detect and determine a quantity of people in the room 100, for example via one or more recognition techniques. For example, when the input data includes video data, the video data may be analyzed via object recognition techniques to detect and count people within the room. For example, an object recognition analysis may include analyzing an image to detect shapes within the image that correspond to human features, such as circular, ovular, elliptical, linear or other shapes that correspond a face, eyes, mouth, nose, etc. A distance between the detected shapes may also be determined to confirm that they correspond to common realistic relative positions or distances between human features, such as distances between eyes, relative positions between eyes and a mouth, etc. As another example, when the input data includes audio data, the audio data may be analyzed via audio recognition techniques to detect distinct voices within the room (each corresponding to a distinct person) and count people within the room. In some examples, an audio analysis may include detecting and grouping and/or clustering of portions of audio that have common audio characteristics, such as common amplitudes at various frequencies, common pitch, tone, stress, and the like. In some examples, to assist in performing this analysis, audio data may be transformed to the frequency domain. As will be described in greater detail below, in some examples, occupancy detection components 121, comparison components 122 and/or other components of FIG. 1 may be distributed across any number of computing devices, such as one or more local computing devices (e.g., devices within, or in close proximity to, room 100) and one or more remote (e.g., cloud-based) computing devices. For example, in some cases, audio, video and/or other data captured by input data components 110 may be sent to one or more remote computing devices over one or more networks via communications components 132. In particular, the input data (and/or other data) may be transmitted and received by communications components 132 over one or more local area networks (LANs) and/or one or more wide area networks (WANs) such as the Internet.

As another example, at least part of the input data may be received from short-range wireless receiver 113 and/or access point 114, and this data may be used to count a quantity of mobile computing devices 161-169 (e.g., smartphones, tablets, etc.) that connect to the short-range wireless receiver 113 and/or access point 114. In some examples, it may be presumed that each person in the room 100 has a respective device that may connect to the short-range wireless receiver 113 and/or access point 114. For example, as shown in FIG. 1, each of people 141-149 has a respective mobile computing device 161-169, such as a smartphone or tablet. Thus, the quantity of people in the room 100 may be determined based on the quantity of mobile computing devices 161-169 that may connect to short-range wireless receiver 113 and/or access point 114. As yet another example, other technologies, such as radar, ultrasonic, acoustic location, and the like, may be employed to detect and count the quantity of people 141-149 in the room 100.

Once a quantity of people in the room is detected by occupancy detection components 121, the comparison components 122 may compare the detected quantity of people to a threshold quantity. In some examples, if the detected quantity of people exceeds the threshold quantity of people, then the room may be determined to be over-occupied. For example, as shown in FIG. 1, detected person quantity 191 represents the people detected and counted by occupancy detection components 121. In the example of FIG. 1, the detected person quantity 191 is nine. Additionally, in the example of FIG. 1, the threshold person quantity 192 is five. As shown in FIG. 1, the computing system 135 has generated an alert 193 indicating that the detected person quantity 191 (which is nine) in the current room (room 100) exceeds the threshold person quantity 192 (which is five).

In some examples, the alert 193 may be provided using a variety of formats, such as displayed text and/or graphics, sounds, spoken text (e.g., recorded human and/or computer-generated spoken text), lights, tactile alters, and/or other formats. In some examples, the alert 193 may include words, such as the words of alert 193 shown in FIG. 1. In other examples, the alert 193 may include non-verbal or non-textual formats, such as a blinking light, vibration, beep, and the like. In some cases, the alert 193 may be provided via output components 131, such as a display, speakers and the like. Also, in some cases, the alert 193 may be provided via one or more types of communications, such as an email, phone call, text, chat message, or other communication or signal. In some examples, the alert 193 may be provided via multiple communications, such as via communications (e.g., phone calls, text messages, etc.) that may be sent to each of mobile computing devices 161-169. In some examples, in addition or as an alternative to people 141-149 in room 100, the alert 193 may be sent to other individuals or entities, such as to a system administrator, to room scheduling software, to other people in a meeting or conference with people 141-149, to a database that collects room usage information and statistics, and to other individuals or entities.

Figure 2:
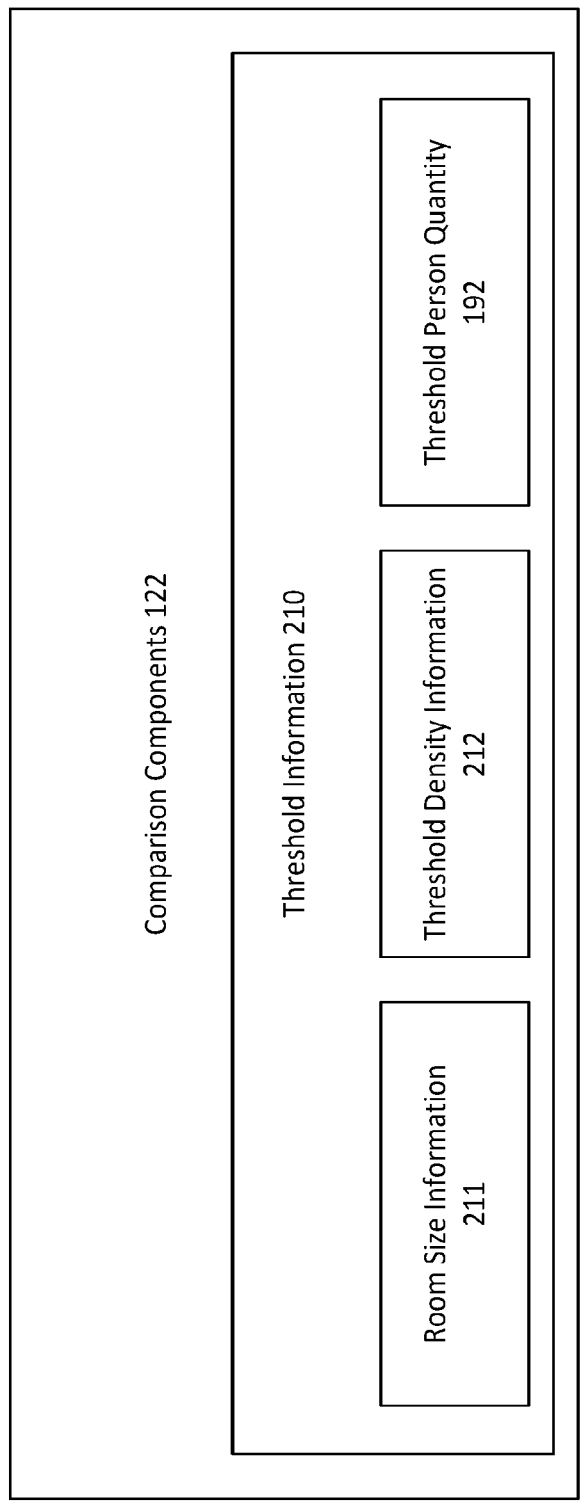
FIG. 2 is a diagram illustrating example threshold information that may be used in accordance with the present disclosure.

In some cases, the threshold person quantity 192 may be determined by the computing system, such as based on a size of the room and a selected threshold person density for the room. For example, referring now to FIG. 2, comparison components 122 may have access to threshold information 210, which includes room size information 211, threshold density information 212, and threshold person quantity 192. Room size information 211 may include information associated with a size of the room 100, such as an area and/or volume of the room 100. In some examples, computing system 135 may calculate an area, volume or other size of the room 100 based on input data captured by input data components 110. For example, the room size may be calculated using an object recognition analysis of video data captured by camera(s) 111 or other types of input data (e.g., radar, ultrasonic, acoustic location, etc.) to detect walls, a floor and/or a ceiling of the room 100 and to determine their dimensions (length, width and/or height) and/or distances therebetween. The computing system 135 may then calculate the room size based on those dimensions and/or distances. In other examples, the room size may be provided to the computing system 135, such as by a user or other entity. In yet other examples, dimensions of the walls, floor and/or a ceiling may be provided to the computing system 135, which may calculate the room size based on those dimensions.

Threshold density information 212 includes information associated with the threshold person density. The threshold person density may be a selected maximum acceptable density of people. The threshold person density may be set by one or more entities, such as an administrator, a human resources department at a business or other organization, a meeting organizer, or other individuals or entities. In some examples, the threshold person density may be a static amount that does not change. In other examples, the threshold person density may vary based on factors such as date, time, month, season, and/or other factors. For example, in some cases, the threshold person density may be lower during seasons when contagious diseases are more commonly spread, such as fall and winter. By contrast, in some cases, the threshold person density may be higher during seasons when contagious diseases are less commonly spread, such as spring and summer. In some examples, the threshold person quantity 192 may be determined based on the room size and the threshold person density. In one specific example, the threshold person quantity 192 may be determined as a product of the room size and the threshold person density, such as by multiplying the room size and the threshold person density.

In some examples, an alert may include or otherwise be associated with one or more notifications. These notifications may assist in reducing the quantity of people in the room 100, for example by providing requests for one or more people in the room to exit the room and/or move to another location, such as another available room. Additionally, these notifications may be provided via any of the formats and/or types of communications described above with reference to alert 193 of FIG. 1 (e.g., via email, phone call, text, chat message, via display and/or speakers of computing system 135, etc.). Referring now to FIG. 3, some example notifications will now be described in detail. As shown, notification 301 includes a request to move a current meeting to Room A, which is currently available and is large enough to acceptably fit all people from the current room. By contrast, notification 302 indicates that there is no other currently available room that is large enough to acceptably fit all people from the current room. Accordingly, in this example, instead of instructing all people from the current room to move to a larger room, the people from the current room may be split between the current room and another available room (Room B). Specifically, notification 302 includes a request for four of the people from the current room move to Room B. For example, as shown in FIG. 1, the detected person quantity 191 for room 100 is nine, while the threshold person quantity 192 is five. In this example, the detected person quantity 191 could be reduced from nine to five by having four people move from room 100 to another room (Room B). Room B may have conferencing capabilities that may allow the people that move to Room B to communicate with the remaining people in room 100 and potentially other rooms or locations. As another example, notification 303 also indicates that there is no other currently available room that is large enough to acceptably fit all people from the current room. However, in this example, notification 303 indicates that Room C, which is large enough to fit all people from the current room, will become available at 3:00. Accordingly, Notification 303 includes a request to delay the current meeting until 3:00 and then resume the meeting in Room C.

Figure 4:
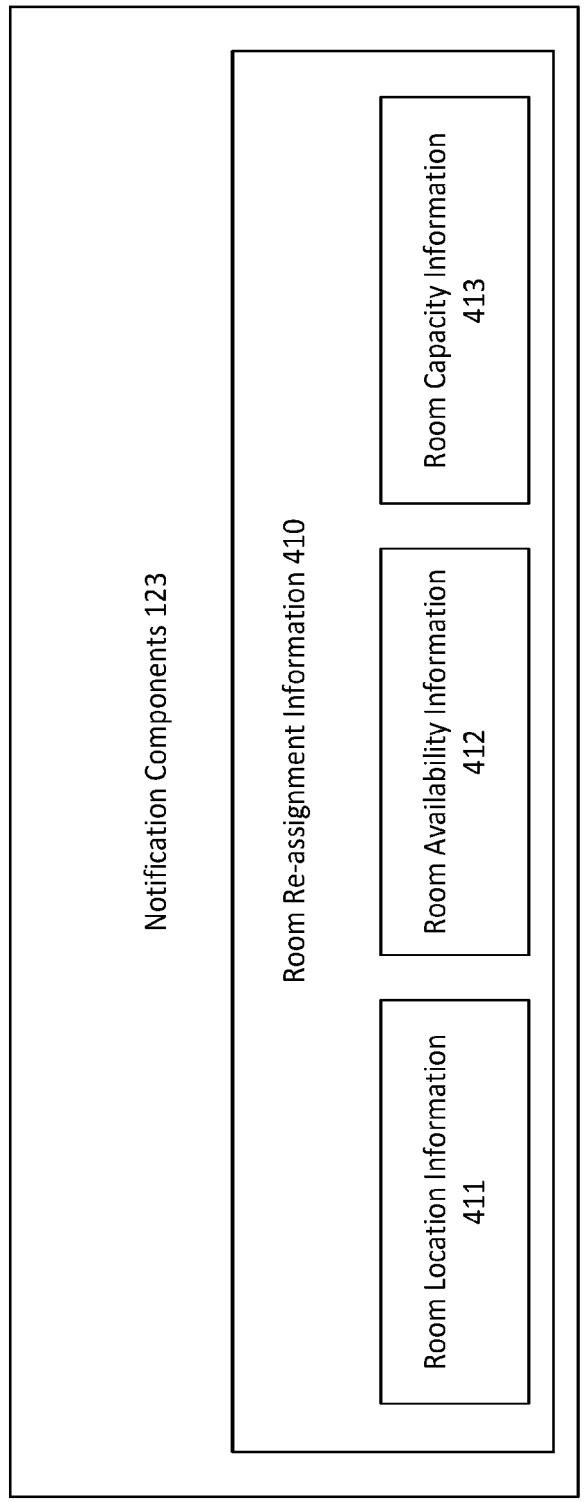
FIG. 4 is a diagram illustrating example room re-assignment information that may be used in accordance with the present disclosure.

In some examples, the notifications 301-303 may be generated by notification components 123 of FIG. 1. Referring now to FIG. 4, it is shown that room re-assignment information 410 may be made available to notification components 123 to assist in generating notifications 301-303. The room re-assignment information 410 may be used to determine other rooms that are in proximity of the current room, as well as the availability and capacity of those rooms. In the example of FIG. 4, room re-assignment information 410 includes room location information 411, room availability information 412 and room capacity information 413. Room location information 411 may include information regarding the location of rooms, such as a building, floor, hall, wing, etc. in which a room is located, geographic or other coordinates of the rooms, and/or distances between rooms or from rooms to other landmarks (e.g., distance to elevator shaft, stairway, etc.). Room availability information 412 may include information regarding dates and times during which rooms are available and/or unavailable. For example, a room may be unavailable during times that it has been reserved or is otherwise being used. In some examples, room availability information 412 may be received from room scheduling software that may communicate with notification components 123. In some examples, room location information 411 and room availability information 412 may be used to determine currently available rooms that are within a threshold proximity to a current room, such as within a same building, floor, hall and/or wing as the current room and/or within a specified threshold distance of the current room. In some examples, notification components 123 may use room location information 411 and room availability information 412 to determine rooms within a threshold proximity to the current room that are currently available and that are also available for an entire expected duration of a current meeting occurring in the current room. Room capacity information 413 may include information regarding room capacities, such as room sizes and/or room threshold person quantities. This may assist in allowing a determination of other available rooms that are large enough to fit some, or all, of the people from a current room.

In some examples, data regarding the detected quantity of people within a room may be collected over time and used to understand how to utilize the room and other organizational spaces more efficiently. For example, in some cases, a report may be generated that indicates usage characteristics of the room during a selected time period. Referring now to FIG. 5, some example room usage reports, including report 501 and report 503, will now be described in detail. Specifically, report 501 is an example usage report for Room X, which has a threshold person quantity of ten people. Report 501 includes a Meeting Identification (ID) column 511, a Meeting Time column 512, a Maximum (Max) Detected People column 513, a Requests column 514 and a Compliance column 515. Meeting ID column 511 provides identifiers for meetings that occurred in in Room X during a time period covered by report 501. Meeting Time column 512 indicates a date and time for each respective listed meeting. Max Detected People column 513 indicates a maximum quantity of people that were detected within Room X at any given time during a respective meeting. Requests column 514 indicates requests that were given as part of an alert or notification when a threshold person quantity (ten people) for Room X is exceeded. Compliance column 515 indicates whether the requests indicated in Requests column 514 were complied with.

In this example, based on the information shown in report 501, recommendations 502 are generated. In some examples, recommendations 502 (as well as recommendation 504 discussed below) may be generated by a computing system and provided to an administrator or other individual or entity. As indicated by report 501, the threshold person quantity (ten people) of Room X was exceeded during each of the three meetings (Meetings A-C) that occurred in Room X. Based at least in part on this information, recommendations 502 include a suggestion to encourage meeting participants to use larger rooms when appropriate. Additionally, recommendations 502 include a suggestion to combine Room X with an adjacent room (if available). As noted in Requests column 514, during Meeting C, a request was given to the meeting participants to delay the meeting until a larger room became available. However, as indicated by Compliance column 515, this request was not complied with by the meeting attendees. Based at least in part on this information, recommendations 502 include a suggestion to provide additional training to observe room capacities, alerts and requests.

Report 503 is an example usage report for Room Z, which has a threshold person quantity of fifty people. Report 503 includes Meeting Identification (ID) column 511, Meeting Time column 512, and Maximum (Max) Detected People column 513, which in this case provide information for meetings in Room Z. Because none of the meetings shown in report 503 exceeded the threshold person quantity of Room Z, Requests column 514 and Compliance column 515 are omitted from report 503. In this example, based on the information shown in report 503, recommendations 504 are generated. As indicated by report 503, the threshold person quantity (fifty people) of Room Z was not exceeded during any of the three meetings (Meetings D-F) that occurred in Room Z. In fact, in this example, the maximum amount of detected people in Room Z for each of the meetings was substantially less than (e.g., less than ten percent of) the threshold person quantity of fifty people. Based at least in part on this information, recommendations 504 include a suggestion to encourage meeting participants to use smaller rooms when appropriate. Additionally, recommendations 504 include a suggestion to divide Room Z into multiple smaller rooms.

Figure 6A:
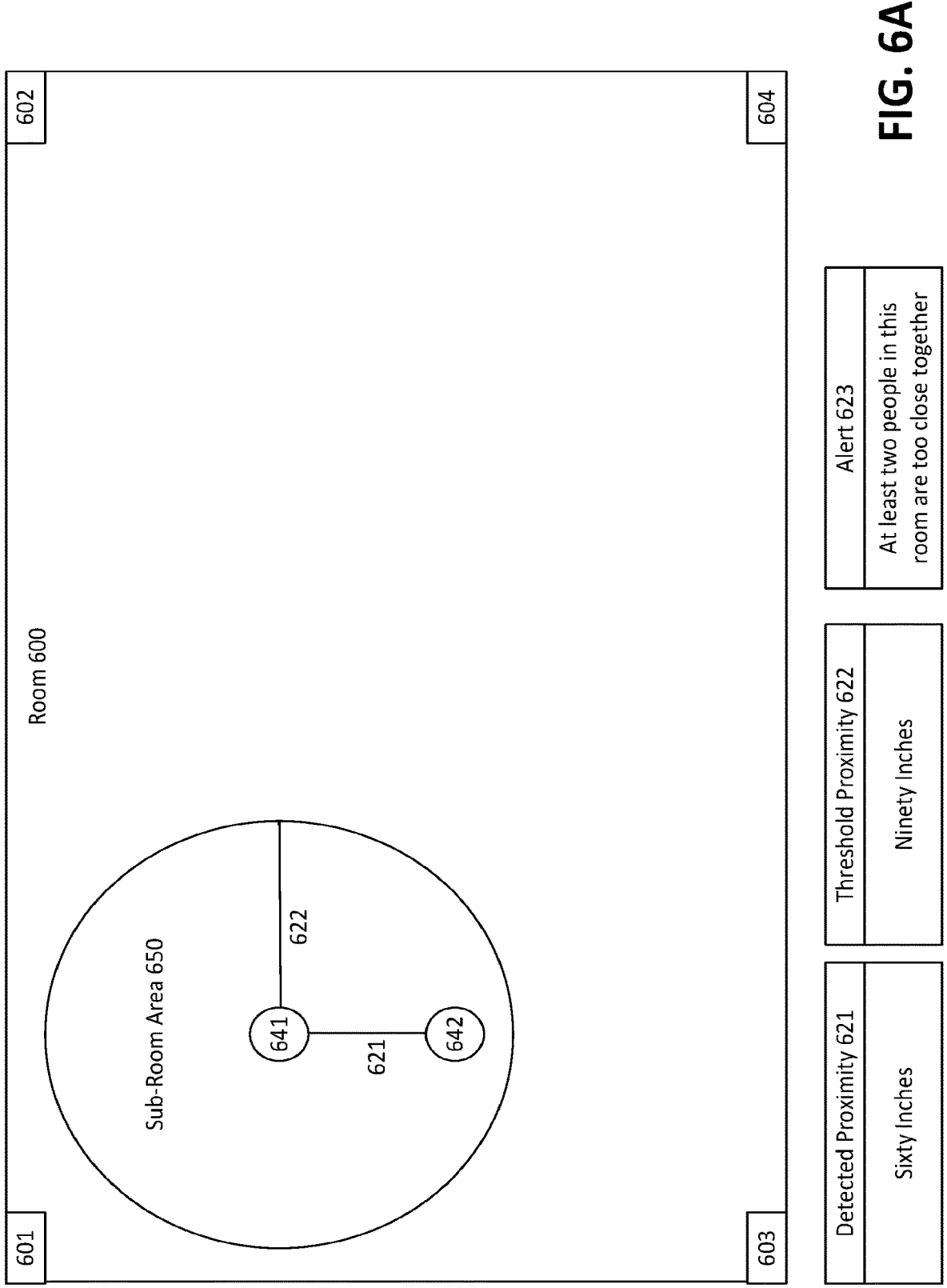
FIGS. 6A and 6B are diagrams illustrating example audio-based proximity alert systems that may be used in accordance with the present disclosure.
Figure 6B:
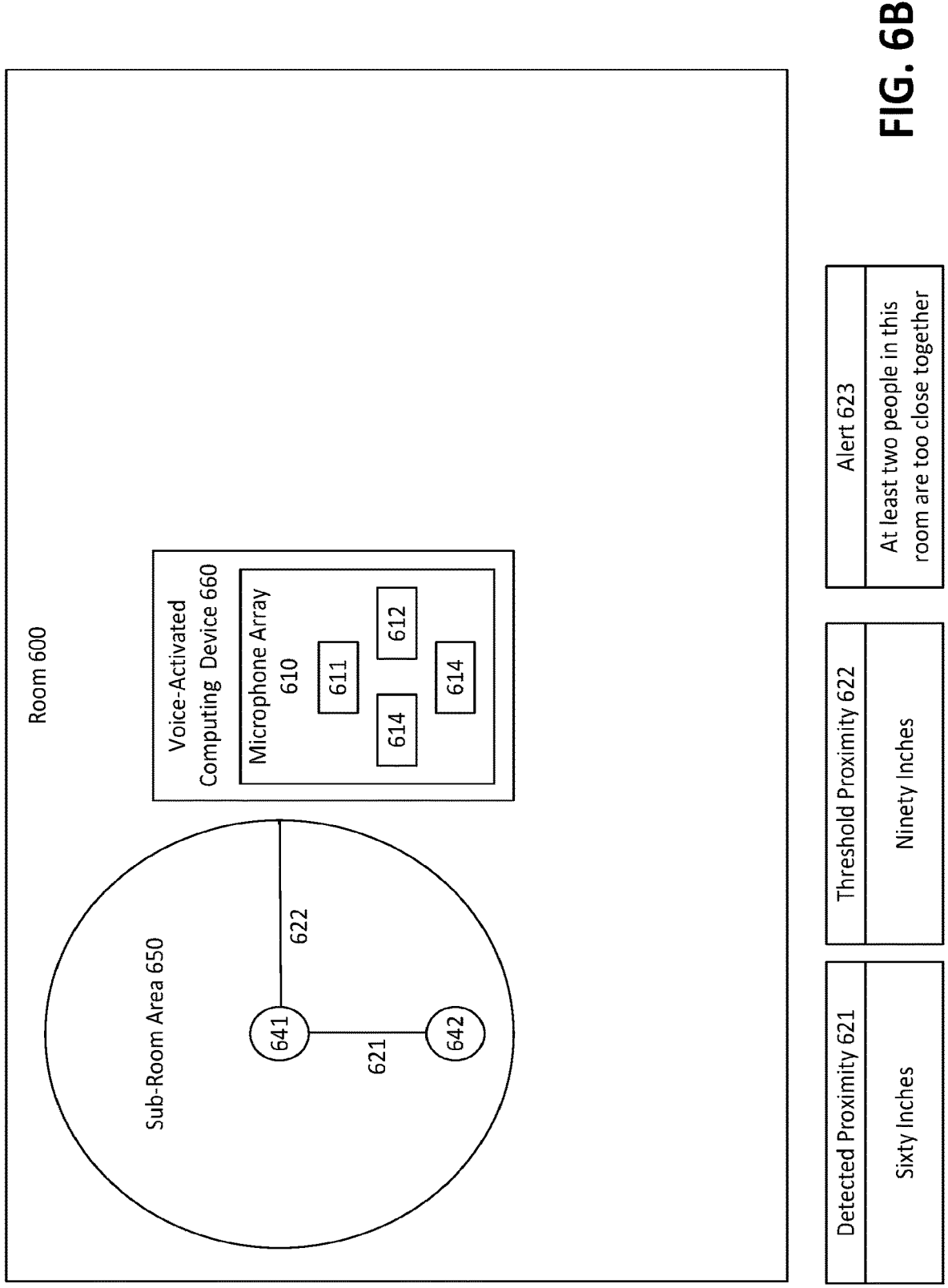

Computing system 135 may also use the input data to determine locations of people in a room and determine a proximity (e.g., distance) of people in the room to one another. In some cases, locations of people in the room may be determined based on audio data received from a plurality of microphones at a plurality of locations within the room (e.g., a microphone array, etc.). Referring now to FIGS. 6A and 6B, some examples of audio-based proximity alert system will now be described in detail. In FIG. 6A, a first example is shown in which a room 600 includes microphones 601-604 located at four corners of the room 600. In this example, the room 600 includes person 641 and person 642. Microphones 601-604 may be used to determine estimated locations of person 641 and person 642 within room 600. For example, microphones 601-604 may capture audio data and provide the captured audio data to computing system 135. Computing system 135 may perform an audio recognition analysis to determine a first portion of captured audio data that includes one or more words spoken by person 641. The computing system may then determine characteristics (e.g., receipt time, amplitude etc.) of the first portion of the audio data received by the plurality of microphones 601-604 and compare the received characteristics to determine a location of person 641. In one specific example, a time at which the first portion of audio data is received by one or more microphones may be compared against times at which the first portion of audio data is received by one or more other microphones. These receipt times may then be used to indicate the location of person 641. For example, because person 641 is closer to microphone 601 than to microphones 602, 603 or 604, words spoken by person 641 may be captured by microphone 601 at an earlier time than those words are captured by microphones 602, 603 or 604. Moreover, the differences between the receipt times for microphones 601-604 may be used to determine relative distances of the person 641 between the microphones 601-604, thereby enabling the location of person 641 to be estimated. As another example, an amplitude (e.g., volume) of the first portion of audio data received by one or more microphones may be compared against amplitudes (e.g., volumes) of the first portion of audio data is received by one or more other microphones. These amplitudes may then be used to indicate the location of person 641. For example, because person 641 is closer to microphone 601 than to microphones 602, 603 or 604, words spoken by person 641 may be captured by microphone 601 at a higher (e.g., louder) amplitude than those words are captured by microphones 602, 603 or 604. Moreover, the differences between the amplitudes for microphones 601-604 may be used to determine relative distances of the person 641 between the microphones 601-604, thereby enabling the location of person 641 to be estimated. The above described processes may be repeated for person 642, such as by performing an audio recognition analysis to determine a second portion of captured audio data that includes one or more words spoken by person 642. The computing system may then determine characteristics (e.g., receipt time, amplitude etc.) of the second portion of the audio data received by the plurality of microphones 601-604 and compare the received characteristics to determine a location of person 642, for example using the receipt time and/or amplitude comparison techniques described above.

FIG. 6B shows a second example is shown in which room 600 includes a microphone array 610, which includes microphones 611-614. In this example, the microphone array 610 is included in a voice-activated computing device 660. It is noted that, although the microphones 611-614 are included in a single device (voice-activated computing device 660), the microphones 611-614 are nevertheless positioned at different locations with respect to one another. It is noted that the microphone configurations of FIGS. 6A and 6B are not mutually exclusive and may optionally be used in combination with one another in the same room. Microphones 611-614 of FIG. 6B may be used in a same (or similar) manner as microphones 601-604 of FIG. 6A to determine estimated locations of person 641 and person 642 in room 600. For example, in some cases, respective receipt times at which words spoken by person 641 are received by microphones 611-614 may be compared against each other to determine a location of person 641. As another example, respective amplitudes of words spoken by person 641 received by microphones 611-614 may be compared against each other to determine a location of person 641. These processes may then be repeated for words spoken by person 642 to determine an estimated location of person 642.

Upon determining locations of person 641 and person 642, the computing system may then determine a calculated proximity 621 of person 641 to person 642. In the examples of FIGS. 6A and 6B, the calculated proximity 621 is determined to be sixty inches. The calculated proximity 621 may then be compared to a threshold proximity 622. In the examples of FIGS. 6A and 6B, the threshold proximity 622 is ninety inches. Accordingly, as shown in FIGS. 6A and 6B, an alert 623 is generated. The alert 623 indicates that at least two people in room 600 are too close together. The alert 623 may include a notification that instructs people to move further apart from one another. The alert 623 may be provided using any of the example formats or communication types described above for other alerts, such as for alert 193 of FIG. 1.

The threshold proximity 622 may be set by one or more entities, such as an administrator, a human resources department at a business or other organization, a meeting organizer, or other individuals or entities. In some examples, the threshold proximity 622 may be a static amount that does not change. In other examples, the threshold proximity 622 may vary based on factors such as date, time, month, season, and/or other factors. For example, in some cases, the threshold proximity 622 may be larger during seasons when contagious diseases are more commonly spread, such as fall and winter. By contrast, in some cases, the threshold proximity 622 may be smaller during seasons when contagious diseases are less commonly spread, such as spring and summer.

In some cases, in order to determine whether people in a room are too close together, sub-room areas may be determined for one or more people in the room. In some cases, if more than one person is included in a sub-room area, then it may be determined that people in a room are too close together. As shown in FIGS. 6A and 6B, a sub-room area 650 may be determined based on the location of person 641. In the examples of FIGS. 6A and 6B, the sub-room area 650 is an area within a circle that surrounds the person 641 at a distance of the threshold proximity 622 from person 641. As shown, the computing system may determine that, in addition to person 641, person 642 is also included within the sub-room area 650. In some examples, alert 623 may be generated based on this determination.

In some cases, audio data (e.g., from microphones 601-604, microphones 611-614 and/or microphones) and/or other input data (e.g., video data, etc.) may be used to determine an average proximity of people in the room to one another, such as an average proximity of each person in the room to each other person in the room or an average proximity of each person in the room to a closest other person in the room. This average proximity may then be compared to the threshold proximity 622, and an alert may be generated if the average proximity is less than threshold proximity 622. Alternatively, an alert may be generated if a threshold amount of people in the room (e.g., fifty percent, two-thirds, etc.) have a proximity to one another (or to another closest person) than is less than the threshold proximity 622.

Figure 7:
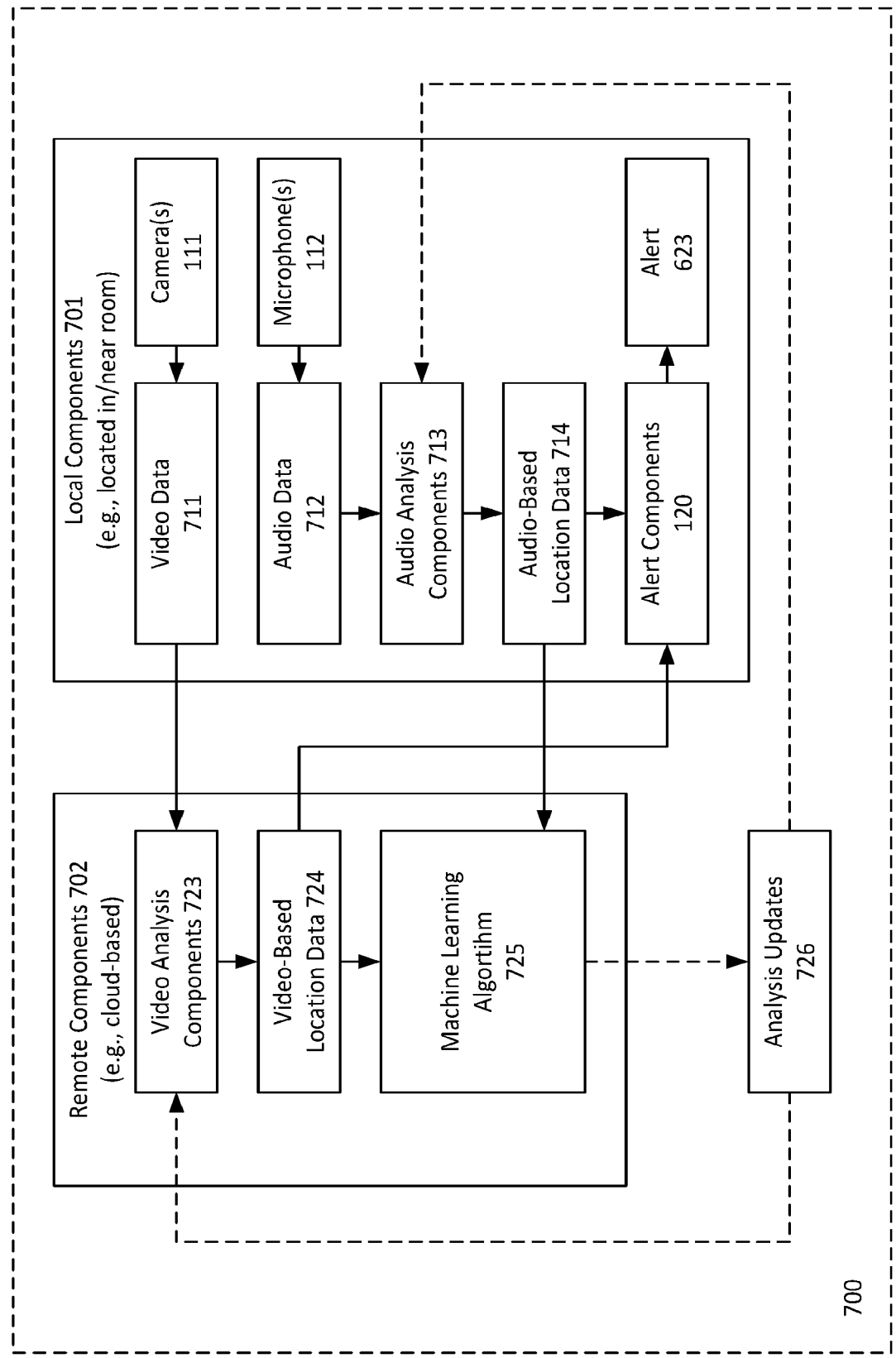
FIG. 7 is a diagram illustrating an example proximity detection system that may be used in accordance with the present disclosure.

In some examples, in addition or as an alternative to audio data, other forms of input data (e.g., video data, radar data, ultrasonic data, wireless network connection data, etc.) may be analyzed to determine locations of people in the room. Referring now to FIG. 7, an example is shown of a proximity detection system 700, which employs both audio data and video data to determine people's locations within a room. In the example of FIG. 7, proximity detection system 700 includes local components 701, which are located in or near the room that includes the people whose locations are being detected. The proximity detection system 700 also includes remote components 702, which may be cloud-based or otherwise remote from the room that includes the people whose locations are being detected. As shown, the local components 701 include camera(s) 111, which capture video data 711, and microphone(s) 112, which capture audio data 712. In this example, the audio data 712 is analyzed locally by audio analysis components 713 to determine audio-based location data 714. For example, microphone(s) 112 may include multiple microphones positioned at different locations throughout the room, such as microphones 601-604 of FIG. 6A and/or microphones 611-614 of FIG. 6B. The audio analysis components 713 may analyze the audio data 712 to determine a location of a first person in the room, for example based on receipt times and/or amplitudes of portions of the audio data 712 corresponding to the first person, such as described above with reference to FIGS. 6A and 6B. This process may then be repeated for respective portions of audio data for each other person in the room to determine the respective locations of each other person in the room. Audio-based location data 714 may include the estimated locations of the people that are determined based on the audio data 712.

Also, in this example, the video data 711 is analyzed remotely by video analysis components 723 to determine video-based location data 724. The video data 711 may be analyzed remotely because analysis of the video data 711 may sometimes require additional computing resources that may not be as readily available locally. In some examples, video analysis components 723 may perform an object recognition analysis on the video data 711 to detect people within the video data 711 and to determine their locations within the room. In some examples, the audio-based locations may be estimated locations that are less precise/accurate than the video based locations. Thus, in some examples, after being calculated remotely, the video-based location data 724 may be sent back to the local components 701 to confirm or adjust the audio-based location data 714. In particular, the alert components 120 may employ the audio-based location data 714 and/or the video-based location data 724 to generate an alert 623 when people within the room are determined to be too close together to one another. In some cases, because the audio-based location data 714 is generated locally, it may sometimes be available to alert components 120 more quickly than the video-based location data 724. Thus, in some examples, the alert components 120 may generate an initial/preliminary alert based on the audio-based location data 714. When the video-based location data 724 becomes available at a later time, the alert components 120 may either confirm the initial/preliminary alert with a follow-up alert (if the estimated audio-based locations are confirmed by the more precise video-based locations) or withdraw or correct the initial/preliminary alert (if the estimated audio-based locations are not confirmed by the more precise video-based locations).

Moreover, in some examples, both the audio-based location data 714 and the video-based location data 724 may be used as training inputs that may be provided to a machine learning algorithm 725, which may use the inputs in order to improve and enhance techniques for location estimations. For example, the machine learning algorithm 725 may use the audio-based location data 714 and the video-based location data 724 to determine instances in which audio-based locations were successfully confirmed by video-based locations. The machine learning algorithm 725 may also use the audio-based location data 714 and the video-based location data 724 to determine instances in which audio-based locations were not successfully confirmed by video-based locations. The machine learning algorithm 725 may then assign higher weights/priorities to audio-based techniques that were used in instances in which the audio-based locations were successfully confirmed. By contrast, the machine learning algorithm 725 may then assign lower weights/priorities to audio-based techniques that were used in instances in which the audio-based locations were not successfully confirmed. These and other results may be included in analysis updates 726, which may be provided as feedback from the machine learning algorithm 725 to the audio analysis components 713, the video analysis components 723 and/or other components.

Figure 8:
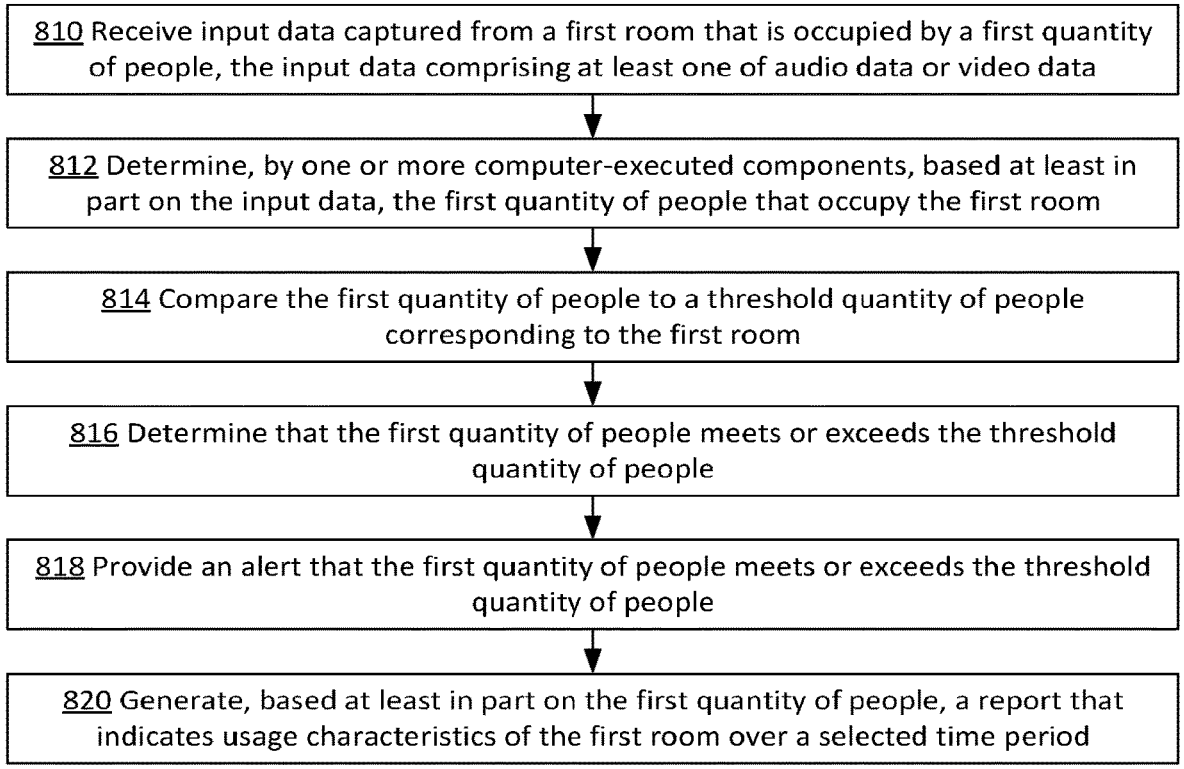
FIG. 8 is a flowchart illustrating an example person density-based alerting process that may be used in accordance with the present disclosure.

FIG. 8 is a flowchart illustrating an example person density-based alerting process that may be used in accordance with the present disclosure. The process of FIG. 8 is initiated at operation 810, at which input data captured from a first room that is occupied by a first quantity of people is received, the input data comprising at least one of audio data or video data. For example, as shown in FIG. 1, video data may be captured from room 100 by camera(s) 111, while audio data may be captured from room 100 by microphone(s) 112. In some examples, the input data may include audio data that is received via one or more microphones included in a voice-activated computing system. As also described above, in some examples, the input data may also optionally include data from a short-range wireless protocol receiver, data from an access point, or data from other input components (e.g., radar, ultrasonic, acoustic location, etc.).

At operation 812, a first quantity of people that occupy the first room is determined, by one or more computer-executed components, based at least in part on the input data. In some examples, the determining of the first quantity of people is performed based on at least one of an object recognition analysis of the video data, an audio recognition analysis of the audio data, a short-range wireless protocol analysis, an access point analysis, or a radar analysis. For example, in some examples, the captured input data may be received by occupancy detection components 121 of FIG. 1, which may analyze the input data to detect and count a quantity of people in the room, for example via one or more recognition techniques. For example, when the input data includes video data, the video data may be analyzed via object recognition techniques to detect and count people within the room. As another example, when the input data includes audio data, the audio data may be analyzed via audio recognition techniques to detect distinct voices within the room (each corresponding to a distinct person) and count people within the room. As another example, at least part of the input data may be received from a short-range wireless (e.g., BLUETOOTH®) receiver and/or other wireless protocol (e.g., WI-FI®) access point, and this data may be used to count a quantity of computing devices (e.g., smartphones, tablets, etc.) that connect to the receiver and/or access point and which, therefore, may be presumed to be in the room. The quantity of people in the room may then be determined based on the quantity of connected computing devices within the room. As yet another example, other technologies, such as radar, ultrasonic, acoustic location, and the like, may be employed to detect and count the quantity of people in the room.

At operation 814, the first quantity of people is compared to a threshold quantity of people corresponding to the first room. In some examples, the threshold quantity of people may be based at least in part on a threshold density of people within the first room. In some cases, the threshold quantity of people may be determined by the computing system, such as based on a size of the room and a selected threshold person density for the room. In one specific example, the threshold person quantity 192 may be determined as a product of the room size and the threshold person density, such as by multiplying the room size and the threshold person density. In some examples, the size of the room may be determined by the computing system, for example based on radar, ultrasonic, acoustic location, and the like. In some examples, the threshold person density may be a static amount. In other examples, the threshold person density may change based on factors such as date, time, month, season, and/or other factors.

At operation 816, it is determined that the first quantity of people exceeds the threshold quantity of people. This determination may be made based on the comparing of the first quantity to the threshold quantity at operation 814. At operation 818, an alert is provided that the first quantity of people exceeds the threshold quantity of people. In some examples, the alert may be associated with a first notification to relocate at least a portion of the first quantity of people to a second room. For example, the notification may instruct all people in the first room to move to the second room, which may be a larger room with a larger person capacity than the first room. As another example, the notification may instruct some (but not all) of the people in the first room to move to the second room, which may have conferencing capabilities that may allow inter-room communication. Additionally, in some cases, the first quantity of people in the first room may be participating in a meeting, and the alert may be associated with a request to delay the meeting until the second room becomes available. In some examples, the second room may be selected based at least in part on an availability of the second room, a capacity of the second room, or a proximity of the second room to the first room.

At operation 820, a report that indicates usage characteristics of the first room over a selected time period is generated based at least in part on the first quantity of people. In some examples, the usage characteristics may indicate a relationship between the threshold quantity of people and a usage of the first room over the selected time period. For example, the report may include indications of occurrences when an alert was generated due to an over-occupancy of the room. The report may also include indications of corresponding requests (e.g., move to larger room, split meeting between multiple rooms, delay meeting, etc.) as well as indications of an extent to which people complied with the requests (e.g., requests followed, requests partially followed, requests not followed, etc.). The report may also include various recommendations. For example, if a room is consistently over-occupied, then recommendations may be made to schedule meetings in a larger room, to combine a room with one or more adjacent rooms, or to train or encourage employees to be more observant of room capacities and corresponding alerts and requests. As yet another example, if observed room capacities are consistently well below the threshold capacity, then recommendations may be made to schedule meetings in a smaller room or to potentially split the existing room into two or more smaller rooms.

Figure 9:
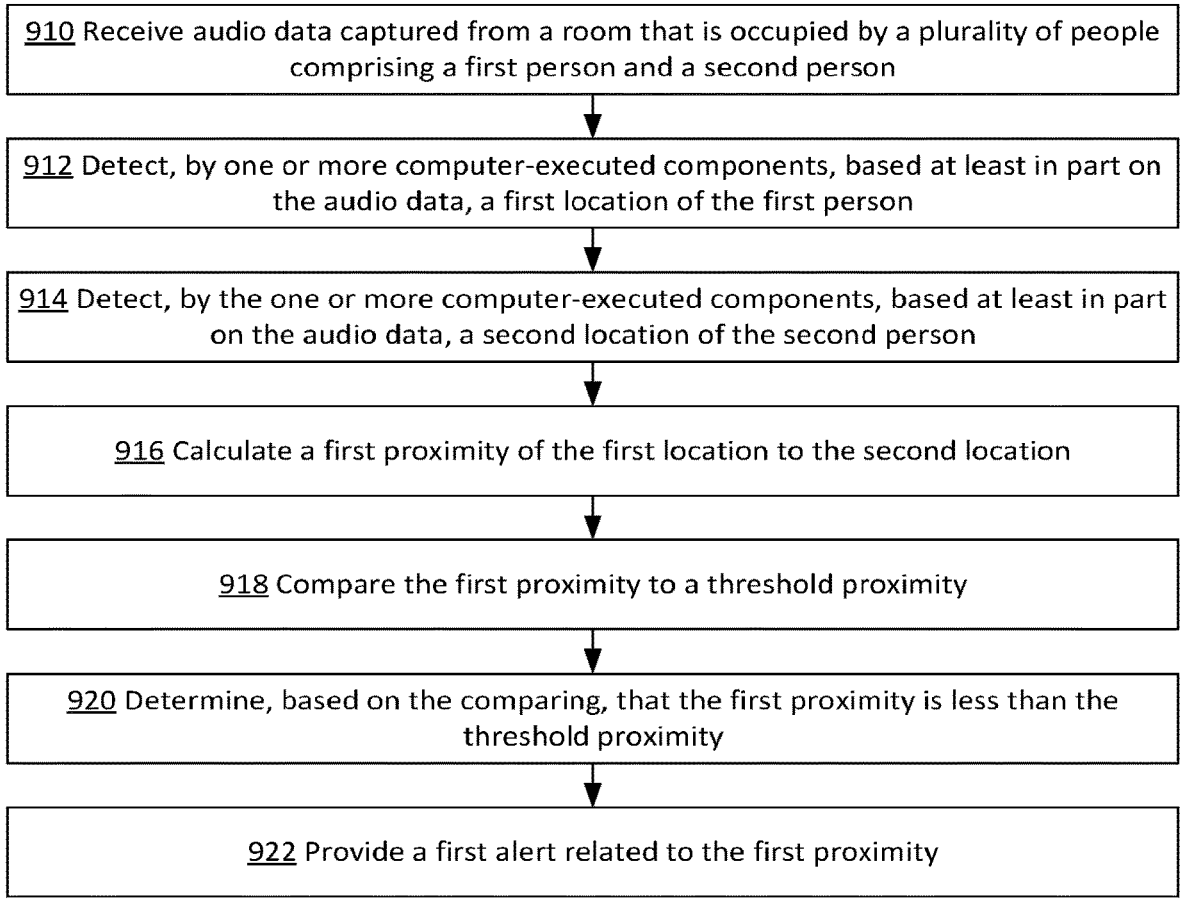
FIG. 9 is a flowchart illustrating an example person position-based alerting process that may be used in accordance with the present disclosure.

FIG. 9 is a flowchart illustrating an example person position-based alerting process that may be used in accordance with the present disclosure. The process of FIG. 9 is initiated at operation 910, at which audio data captured from a room is received. The room is occupied by a plurality of people comprising a first person and a second person. The audio data may be received from a plurality of microphones at a plurality of microphone locations in the room. The plurality of microphones may be included in a plurality of devices or in a microphone array of a single device. For example, as shown in FIG. 6A, microphones 601-604 capture audio data from room 600, which includes person 641 and person 642. Additionally, as shown in FIG. 6B, microphones 611-614 capture audio data from room 600, which includes person 641 and person 642. Microphones 611-614 are included in a microphone array 610 that is included in a voice-activated computing device 660.

At operation 912, a first location of the first person is detected, by one or more computer-executed components, based at least in part on the audio data. In some examples, the first location may be detected based at least in part on one or more first characteristics of a first portion of the audio data received by the plurality of microphones, where the first portion of audio data corresponds to a voice of the first person. Specifically, detecting of the first location may include identifying a first portion of the audio data corresponding to a voice of the first person, detecting characteristics of the first portion of the audio data captured by the plurality of microphones, and detecting the first location based on the characteristics of the first portion of the audio data. In some examples, the first portion of the audio data may be identified based at least in part on an audio recognition analysis. Additionally, in some examples, the characteristics of the first portion of the audio data may include a receipt time of the first portion of the audio data and/or an amplitude of the first portion of the audio data. For example, as described above, an audio recognition analysis may be performed to determine a first portion of captured audio data that includes one or more words spoken by a first person in the room. The computing system may then determine characteristics (e.g., receipt time, amplitude etc.) of the first portion of the audio data received by the plurality of microphones and compare the received characteristics to determine the first person's location within the room. For example, if words spoken by the first person are received by a microphone in the front of the room at an earlier time and/or with a louder/higher amplitude then those words are received by a microphone in the back of the room, then this may indicate that the first person is located closer to the front of the room than to the back of the room. At operation 914, a second location of the second person is detected, by the one or more computer-executed components, based at least in part on the audio data. In some examples, the second location may be detected based at least in part on one or more second characteristics of a second portion of the audio data received by the plurality of microphones, where the second portion of audio data corresponds to a voice of the second person. For example, the above-described process may be repeated for words spoken by a second person in the room in order to determine a location of the second person in the room. In some examples, the first location may be an estimated location of the first person, and the second location may be an estimated location of the second person. Thus, it is not necessarily required that the detected first and second locations must be the exact actual locations of the first person and the second person.

At operation 916, a first proximity of the first location to the second location is calculated. In one specific example, the computing system may generate a two-dimensional and/or three-dimensional coordinate system that may be used to identify locations of people in the room, and the computing system may express the first location and the second location as respective first and second sets of coordinate values. The computing system may then calculate the proximity of the first location to the second location based on distances between the locations identified by the respective first and second sets of coordinate values.

At operation 918, the first proximity to is compared to a threshold proximity. For example, the computing system may compare the first proximity to the threshold proximity by determining whether the first proximity is less than the threshold proximity. At operation 920, it is determined that the first proximity is less than the threshold proximity. This determination may be made based on the comparing of the first proximity to the threshold proximity. In some examples, determining that the first proximity is less than the threshold proximity may include determining, based at least in part on the threshold proximity, a sub-room area that surrounds the first location and determining that the second location is within the sub-room area.

At operation 922, a first alert related to the first proximity is provided. The alert may include a notification that instructs the first person and the second person to move further apart from one another. As described above, in some examples, an alert may also be generated based on an average proximity between the plurality of people in the room. For example, an average proximity between the plurality of people may be determined. The average proximity may be compared to the threshold proximity. A determination may then be made, based on the comparing, that the average proximity is less than the threshold proximity. A second alert related to the average proximity may then be provided. For example, the second alert may instruct all people in the room to move further apart from one another. In some examples, the average proximity may be based on an average proximity of each person in the room to a closest other person in the room. For example, in some cases, the determining of the average proximity may include, for each person in the plurality of people, determining a distance between the person and a closest other person, forming a set of distances that includes the distance that is determined for each person, and calculating the average proximity as an average of the set of distances.

As also described above, in some examples, the detecting of the first location and/or the second location may be further based in part on video data captured from the room. Additionally, in some examples, the audio data may be analyzed locally by one or more computing devices within (or in close proximity to) the room, while the video data may be analyzed by one or more computing devices remote from the room. The analysis may be performed in this manner because analysis of the video data may sometimes require additional computing resources that may not be as readily available locally. For example, as shown in FIG. 7, audio data 712 may be analyzed locally to generate audio-based location data 714, while video data 711 may be analyzed remotely to generate video-based location data 724. Also, in some examples, the audio-based locations may be estimated locations that are less precise/accurate than the video-based locations. Thus, in some examples, after being calculated remotely, the video-based locations may be sent back to the local computing systems to confirm or adjust the estimated audio-based locations. Thus, the first location and/or the second location may include audio based locations that are confirmed and/or adjusted based on video-based locations. Moreover, in some examples, location data determined from both the audio data and the video data may be provided as training input to one or more machine learning algorithms. For example, as shown in FIG. 7, both audio-based location data 714 and video-based location data 724 may be provided as training inputs to machine learning algorithm 725.

Figure 10:
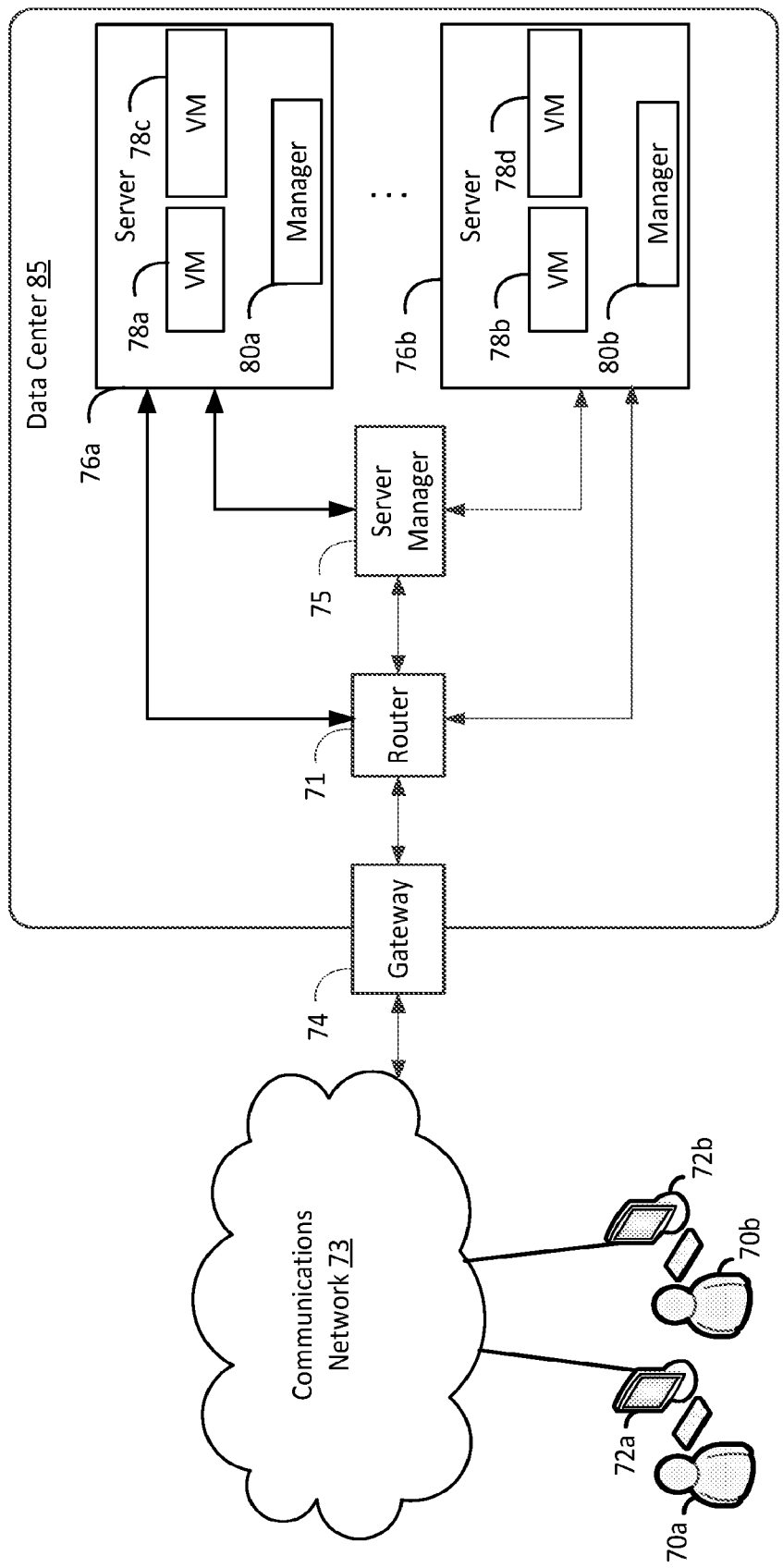
FIG. 10 is a diagram illustrating an example system for transmitting and providing data that may be used in accordance with the present disclosure.

An example system for transmitting and providing data will now be described in detail. In particular, FIG. 10 illustrates an example computing environment in which the embodiments described herein may be implemented. FIG. 10 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 10, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76a and 76b. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 11:
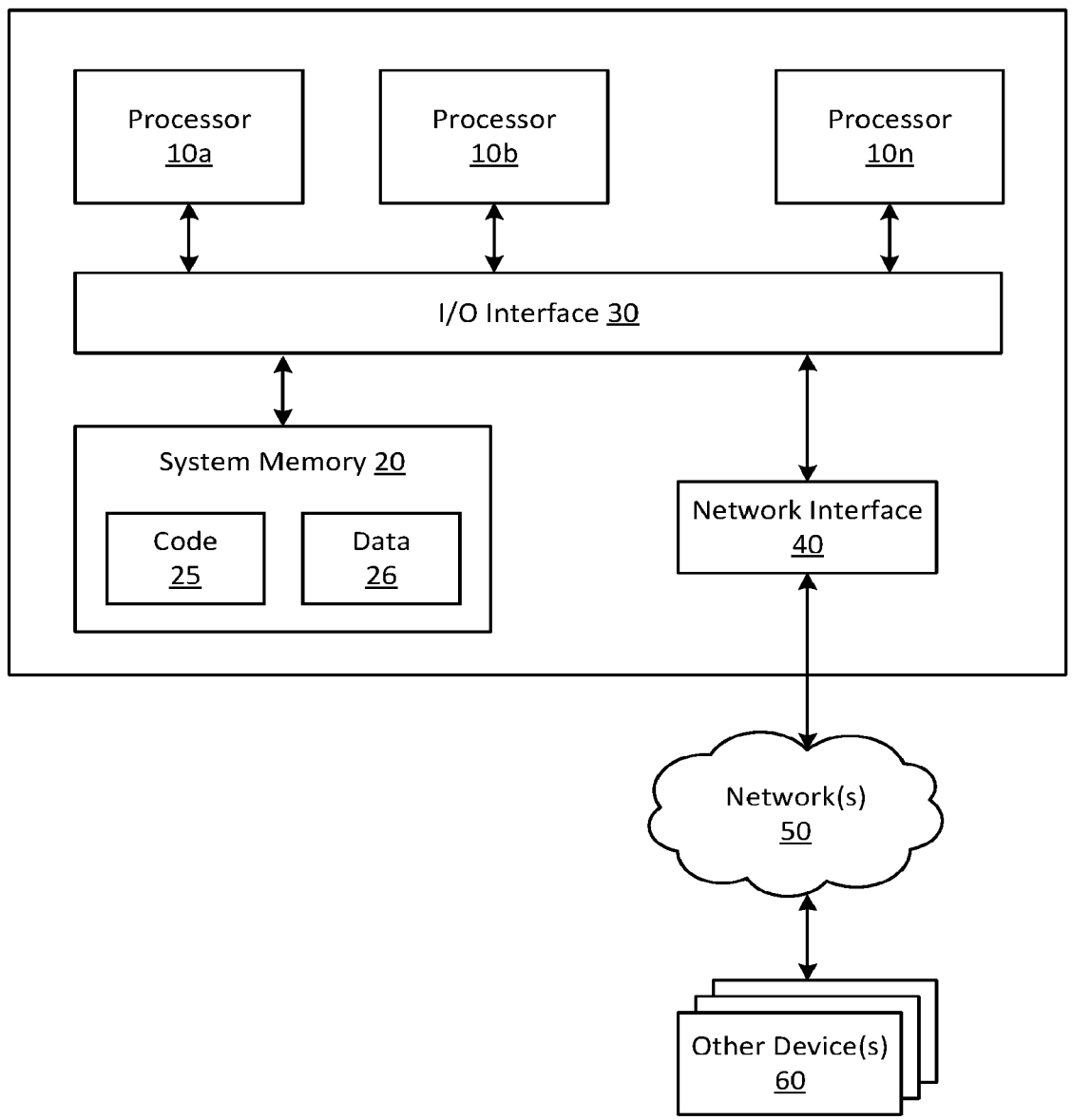
FIG. 11 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
receiving input data captured from a first room that is occupied by a first quantity of people, the input data comprising at least one of audio data or video data;
determining, by one or more computer-executed components, based at least in part on the input data, the first quantity of people that occupy the first room;
comparing the first quantity of people to a threshold quantity of people corresponding to the first room, wherein the threshold quantity of people is based at least in part on a product of a size of the first room and a threshold density of people that changes based on at least one of a date, a month or a season;
determining, based on the comparing, that the first quantity of people violates the threshold quantity of people;
selecting a second room to which to locate a specified sub-quantity of the first quantity of people; and
providing a notification to relocate the specified sub-quantity of the first quantity of people to the second room.

2. The computing system of claim 1, wherein the operations further comprise selecting the second room based at least in part on an availability of the second room, a capacity of the second room, or a proximity of the second room to the first room.

3. The computing system of claim 1, wherein the operations further comprise providing an alert that the first quantity of people violates the threshold quantity of people.

4. The computing system of claim 1, wherein the operations further comprise generating, based at least in part on the first quantity of people, a report that indicates usage characteristics of the first room over a selected time period.

5. The computing system of claim 4, wherein the usage characteristics indicate a relationship between the threshold quantity of people and a usage of the first room over the selected time period.

6. A computer-implemented method comprising:
   receiving input data captured from a first room that is occupied by a first quantity of people, the input data comprising at least one of audio data or video data;
   determining, by one or more computer-executed components, based at least in part on the input data, the first quantity of people that occupy the first room;
   comparing the first quantity of people to a threshold quantity of people corresponding to the first room, wherein the threshold quantity of people is based at least in part on a product of a size of the first room and a threshold density of people that changes based on at least one of a date, a month or a season;
   determining, based on the comparing, that the first quantity of people violates the threshold quantity of people;
   selecting a second room to which to locate a specified sub-quantity of the first quantity of people; and
   providing a notification to relocate the specified sub-quantity of the first quantity of people to the second room.

7. The computer-implemented method of claim 6, further comprising selecting the second room based at least in part on an availability of the second room, a capacity of the second room, or a proximity of the second room to the first room.

8. The computer-implemented method of claim 6, further comprising providing an alert that the first quantity of people violates the threshold quantity of people.

9. The computer-implemented method of claim 6, further comprising generating, based at least in part on the first quantity of people, a report that indicates usage characteristics of the first room over a selected time period.

10. The computer-implemented method of claim 9, wherein
    the usage characteristics indicate a relationship between the threshold quantity of people and a usage of the first room over the selected time period.

11. One or more non-transitory computer-readable storage media having stored thereon computing instructions that, upon execution by one or computing devices, cause the one or more computing devices to perform operations comprising:
    receiving input data captured from a first room that is occupied by a first quantity of people, the input data comprising at least one of audio data or video data;
    determining, by one or more computer-executed components, based at least in part on the input data, the first quantity of people that occupy the first room;
    comparing the first quantity of people to a threshold quantity of people corresponding to the first room, wherein the threshold quantity of people is based at least in part on a product of a size of the first room and a threshold density of people that changes based on at least one of a date, a month or a season;
    determining, based on the comparing, that the first quantity of people violates the threshold quantity of people;
    selecting a second room to which to locate a specified sub-quantity of the first quantity of people; and
    providing a notification to relocate the specified sub-quantity of the first quantity of people to the second room.

12. The one or more non-transitory computer-readable storage media of claim 11, wherein the operations further comprise selecting the second room based at least in part on an availability of the second room, a capacity of the second room, or a proximity of the second room to the first room.

13. The one or more non-transitory computer-readable storage media of claim 11, wherein the operations further comprise providing an alert that the first quantity of people violates the threshold quantity of people.

14. The one or more non-transitory computer-readable storage media of claim 11, wherein the operations further comprise generating, based at least in part on the first quantity of people, a report that indicates usage characteristics of the first room over a selected time period.

* * * * *